United States Patent
Yoneda et al.

(10) Patent No.: US 7,862,398 B2
(45) Date of Patent: Jan. 4, 2011

(54) ROBOT TOY

(75) Inventors: Yosuke Yoneda, Tokyo (JP); Kimitaka Watanabe, Tokyo (JP)

(73) Assignee: Tomy Company, Ltd., Tokyo (JP)

(*) Notice: Subject to any disclaimer, the term of this patent is extended or adjusted under 35 U.S.C. 154(b) by 262 days.

(21) Appl. No.: 11/822,300

(22) Filed: Jul. 3, 2007

(65) Prior Publication Data

US 2008/0160873 A1    Jul. 3, 2008

(30) Foreign Application Priority Data

Dec. 27, 2006    (JP)    .............................. 2006-352818

(51) Int. Cl.
*A63H 13/00*    (2006.01)

(52) U.S. Cl. .................. 446/330; 446/354; 446/355

(58) Field of Classification Search ................ 446/330, 446/354, 355
See application file for complete search history.

(56) References Cited

U.S. PATENT DOCUMENTS

| | | | | |
|---|---|---|---|---|
| 3,547,240 A | * | 12/1970 | Holper | ...................... 192/48.2 |
| 4,831,893 A | * | 5/1989 | Obama et al. | ............. 74/490.05 |
| 5,155,423 A | * | 10/1992 | Karlen et al. | .......... 318/568.11 |
| 5,158,493 A | * | 10/1992 | Morgrey | ...................... 446/355 |
| 5,280,981 A | * | 1/1994 | Schulz | ........................ 294/106 |
| 5,318,471 A | * | 6/1994 | Glovier | ...................... 446/268 |
| 6,454,624 B1 | * | 9/2002 | Duff et al. | ..................... 446/91 |
| 6,902,048 B1 | * | 6/2005 | Chung | ....................... 192/48.2 |

| | | | |
|---|---|---|---|
| 2005/0167167 A1 | | 8/2005 | Miyazaki et al. |
| 2005/0184697 A1 | * | 8/2005 | Iribe et al. ............. 318/568.12 |
| 2006/0033462 A1 | * | 2/2006 | Moridaira .............. 318/568.12 |
| 2008/0160873 A1 | | 7/2008 | Yoneda |

FOREIGN PATENT DOCUMENTS

| | | |
|---|---|---|
| EP | 1 358 971 | 11/2003 |
| JP | 64-43996 | 3/1989 |
| JP | 3-77754 | 12/1991 |
| JP | 9-193059 | 7/1997 |
| JP | 2002-59388 | 2/2002 |
| JP | 2003-136461 | 5/2003 |
| JP | 2004-209250 | 7/2004 |
| JP | 2004-255475 | 9/2004 |
| JP | 2006-35405 | 2/2006 |
| JP | 2006-239848 | 9/2006 |
| JP | 2008-161350 | 7/2008 |

OTHER PUBLICATIONS

Japanese Office Action dated Jan. 27, 2009 in corresponding Japanese Application No. 2006-352818.

(Continued)

*Primary Examiner*—Gene Kim
*Assistant Examiner*—Joseph B Baldori
(74) *Attorney, Agent, or Firm*—Staas & Halsey LLP (57) ABSTRACT

A robot toy including one block to which a servo is installed, another block joined to the one block by fitting an output shaft of the servo to a shaft hole, and a shaft hole diameter adjustment member to change a diameter of the shaft hole so as to be in a condition where the shaft hole is loosely fitted to the output shaft or a condition where the shaft hole is tightly fitted to the output shaft.

3 Claims, 7 Drawing Sheets

OTHER PUBLICATIONS

European Search Report dated May 27, 2008 in corresponding Application No. 07122348.1.
"Nisokuhoko robotto seisaku chonyuumon", Kabushikikaisha Ohmsha. Third Impression of first edition, pp. 140-141, Oct. 5, 2006.
Japanese Office Action mailed Jul. 14, 2009 in Japanese Application No. 2007-371402. (3 pages) (5 pages English translation).
Patent Abstracts of Japan, Publication No. 2004-255475, Published Sep. 16, 2004.
Minoru Otsuka, "[Coramu] Ore no Robotto (5) Homu Pozishon wo Settei site Sanpuru Moshon wo Ugogaku", [online], Sep. 18, 2006, Maicomi Journal, Retrieved on Jul. 7, 2009 from http://journal.mycom.co.ip/column/orerobo/005/index.html.
Patent Abstract of Japan, publication No. 2008-161350, publication date Jul. 17, 2008.
U.S. Office Action mailed Jun. 1, 2010 in U.S. Appl. No. 12/328,457.
"Nisokuhoko robotto seisaku chonyuumon", Kabushikiaisha Ohmsha. Third Impression of First Ed., pp. 140-141, 2005, Section 4.3.
U.S. Appl. No. 12/328,457, filed Dec. 4, 2008, Yoneda et al., Tomy Co., Ltd.
Japanese Office Action issued Aug. 25, 2009 in corresponding Japanese Patent Application 2006-352818 (2 pages) (3 pages English translation).
\*\*Abstract Publication No. 2002-59388, Published Feb. 26, 2002.

\* cited by examiner

ROBOT TOY

BACKGROUND OF THE INVENTION

1. Field of the Invention

The present invention relates to a robot toy and an assembling method thereof, and more particularly, to a robot toy providing a servo and an assembling method thereof.

2. Description of the Related Art

Conventionally, there is known a robot toy having a structure in which one block and another block are joined via a servo. The robot toy is generally assembled in the following manner.

First, a description will be given regarding a leg of the humanoid robot toy. Here, one block in which an RC turbo is installed and the other block which is to be joined thereto are included as components of the leg. In this case, first, a center position (servo zero position) is provided by applying an initial pulse to the signal wire of the servo, and a shaft hole which is formed on the other block is fitted to an output shaft of the servo at the position where the joining unit of the one block and the other block is extended (mechanical zero position). In such way, the adjacent blocks are assembled. Accordingly, the entire leg is assembled.

Further, the components of hand and arm, a body unit and a head unit, and the body unit and the limbs are joined in the same manner as in the case of the leg.

Here, "mechanical zero position" is a position of each component when the robot toy is in a basic posture. In general, an upright posture is the basic posture in the case of the robot toy walking with two legs (for example, see "Nisokuhoko robotto seisaku chonyuumon". Kabushikigaisha Ohmsha. Oct. 5, 2006. Third impression of the first edition, pp. 140-141).

However, there are many cases where the mechanical zero position and the basic starting position (home position) of the robot toy are different. For example, regarding the robot toy walking with two legs, the upright posture position is the mechanical zero position, and a position in which the hip of the robot toy is slightly lowered is the home position. In the case of the robot toy walking with two legs, it is natural to walk by alternatively stepping out the left leg and the right leg forwardly from the position in which the hip of the robot toy is slightly lowered (home position).

Further, as described above, the legs of the robot toy will first take the upright posture position when the initial pulse is applied to the signal wire of the servo because the servo zero position matches with the mechanical zero position. Subsequently, the robot toy slightly lowers the hip, and then, walks by alternatively stepping out the left leg and the right leg forwardly.

Such a movement of the robot toy is unnatural.

Consequently, there is a need for matching the servo zero position with the basic starting position. For example, in the case of the robot toy walking with two legs, there is a need for an adjustment so that the robot toy immediately takes the posture position in which the hip of the robot toy is slightly lowered (basic starting position; home position) when the initial pulse is applied to the signal wire of the servo.

Therefore, conventionally, the servo zero position and the home position were adjusted to match with one another by connecting an IC for control inside the robot toy to a personal computer and changing the pulse width of the initial pulse by an editor.

However, such an operation is complicated.

Such a matter also occurs in a case where there are designing errors in the components of the robot toy.

SUMMARY OF THE INVENTION

The present invention is to solve the above problem, and an object is to provide a robot toy which can easily match the home position with the servo zero position of the robot toy and an assembling method thereof.

In accordance with a first aspect of the present invention, a robot toy includes one block to which a servo is installed, another block joined to the one block by fitting an output shaft of the servo to a shaft hole, and a shaft hole diameter adjustment member to change a diameter of the shaft hole so as to be in a condition where the shaft hole is loosely fitted to the output shaft or a condition where the shaft hole is tightly fitted to the output shaft.

Preferably, the robot toy further includes a position adjustment jig to match a positional relationship between the one block and the another block with a home position when the another block is joined to the one block.

Preferably, a slot communicating with the shaft hole of the another block is provided, and the shaft hole diameter adjustment member is a space adjustment member to change the diameter of the shaft hole so as to be in the condition where the shaft hole is loosely fitted to the output shaft or the condition where the shaft hole is tightly fitted to the output shaft by adjusting a space of the slot.

In accordance with a second aspect of the present invention, an assembling method of the robot toy includes fitting the shaft hole loosely to the output shaft, providing a center position of the servo in the condition where the shaft hole is loosely fitted to the output shaft, matching a positional relationship between the one block and the another block with a home position by a position adjustment jig in the condition where the shaft hole is loosely fitted to the output shaft, and fitting the shaft hole to the output shaft by adjusting the diameter of the shaft hole with the shaft hole diameter adjustment member.

According to the present invention, the one block and the other block can be easily joined in the state where the robot toy is in the servo zero position.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein.

PREFERRED EMBODIMENT OF THE INVENTION

Figure 1:
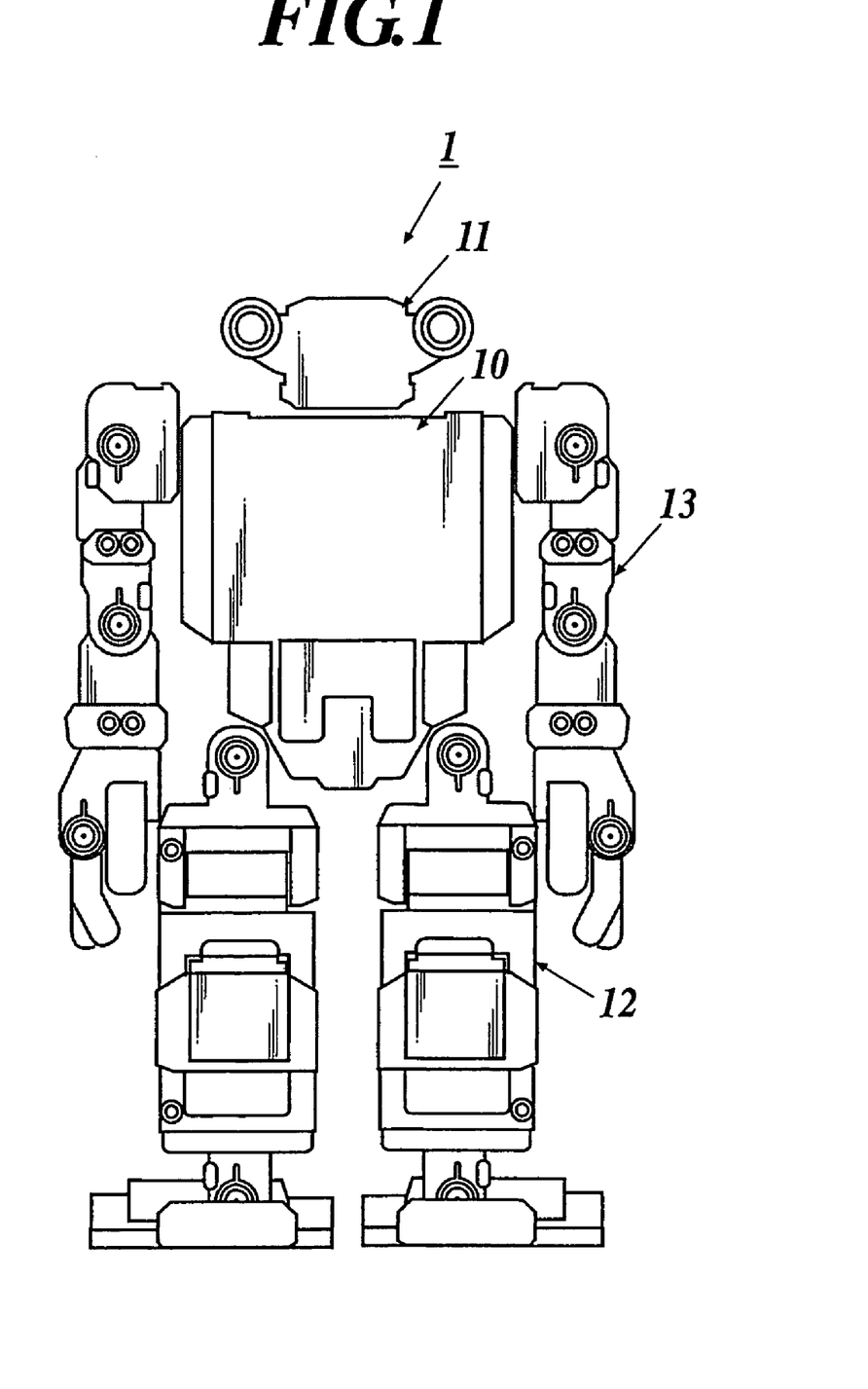
FIG. 1 is a front view of a robot toy according to the embodiment.
Figure 2:
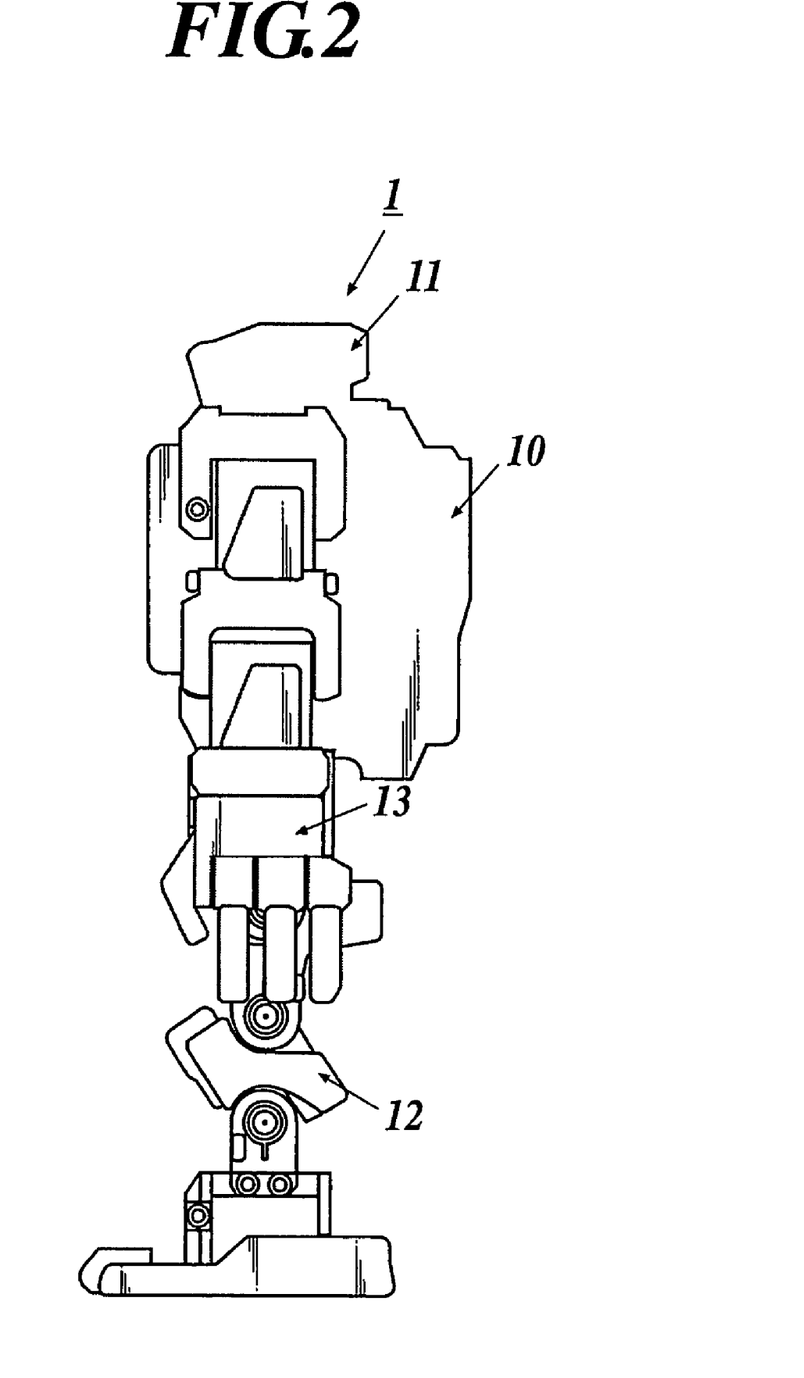
FIG. 2 is a right side view of a robot toy according to the embodiment.

FIG. 1 is a front view of a robot body, and FIG. 2 is a right side view of the robot body.

The movement of a robot toy 1 is remotely controlled by the operation of a controller which is omitted from the drawings. Particularly, the robot toy 1 is constructed so that the movements of limbs of the robot toy 1 are controlled by the operation of the controller.

Figure 3:
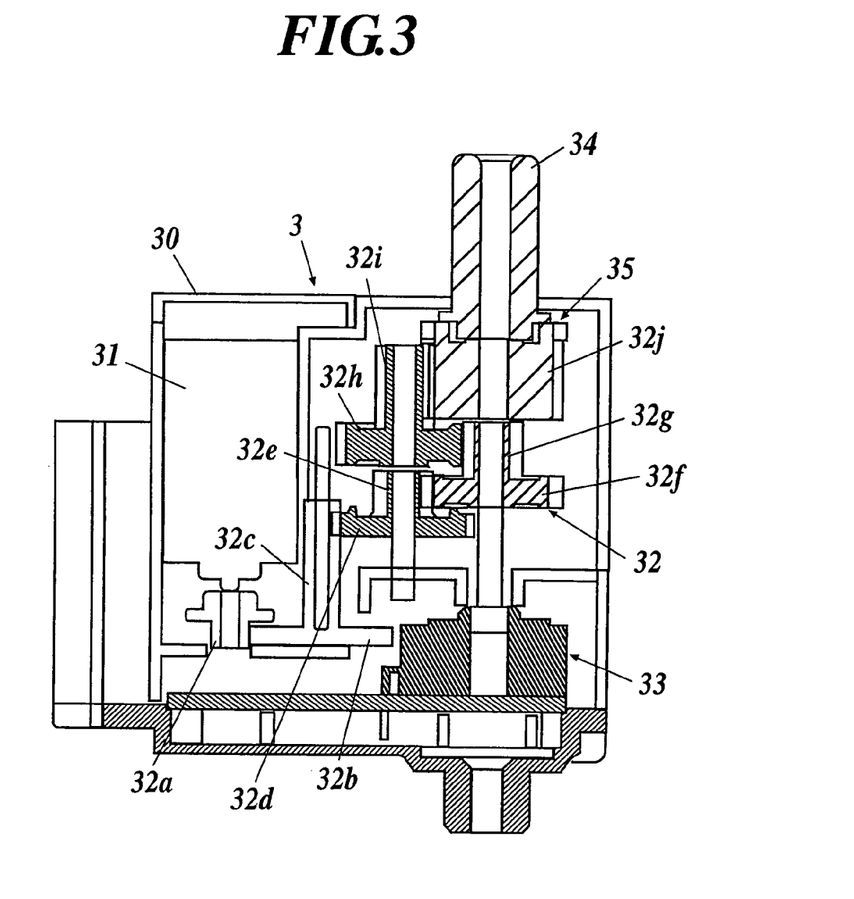
FIG. 3 is a sectional view showing an example of a servo according to the embodiment.

A servo 3 shown in FIG. 3 is installed in the joining units of the limbs of the robot toy 1. The servo 3 includes a servo motor 31 which is housed in a case 30, a decelerating gear mechanism 32, and a rotary encoder 33. The decelerating gear mechanism 32 includes gears 32*a* to 32*j*.

Further, a clutch mechanism 35 is installed between the last gear 32*j* of the decelerating gear mechanism 32 and an output shaft 34.

Figure 4:
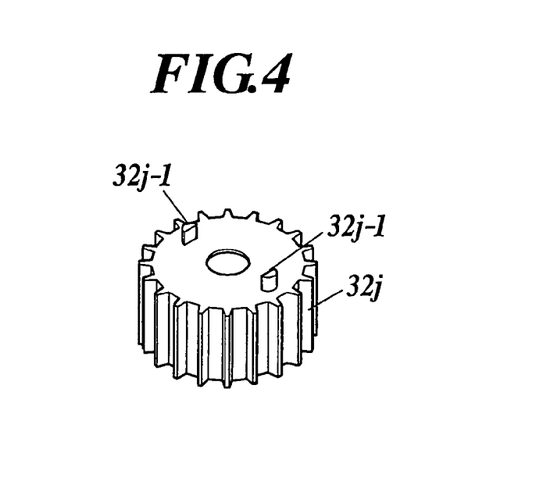
FIG. 4 is a perspective view of one gear in a decelerating gear mechanism which composes a servo according to the embodiment.
Figure 5:
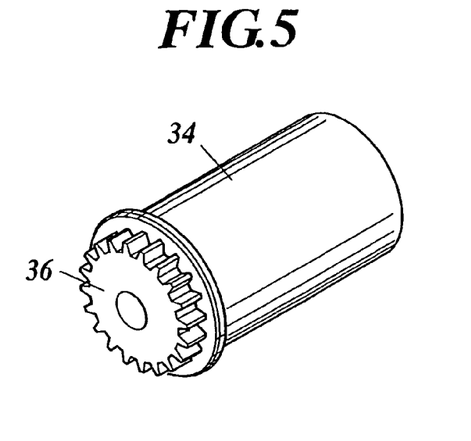
FIG. 5 is a perspective view of an output shaft of a servo according to the embodiment.
Figure 6:
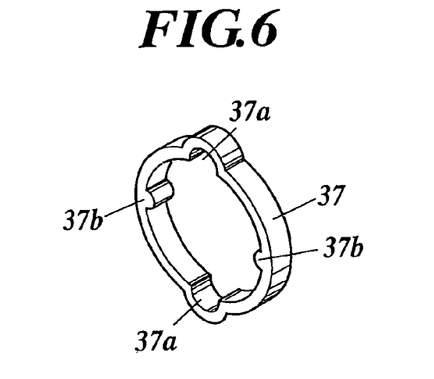
FIG. 6 is a perspective view of a clutch member of a servo according to the embodiment.

That is, the gear 32*j* and the output shaft 34 are constructed so as to rotate independently from one another. Among the gears 32*a* to 32*j*, two half-column shaped protrusions 32*j*-1, 32*j*-1 are provided on the end face of the gear 32*j* as shown in FIG. 4. On the other hand, a gear 36 is provided on the end face of the output shaft 34 as shown in FIG. 5. The gear 32*j* and the gear 36 are joined via a clutch member 37 which is shown in FIG. 6. The clutch member 37 is in a ring shape, and two concaved units 37*a*, 37*a* which engage with the half-column shaped protrusions 32*j*-1, 32*j*-1 and two convexed units 37*b*, 37*b* which engage with the teeth of the gear 36 are formed on the inner periphery of the clutch member 37. When the output shaft 34 is forcibly stopped, while the shaft of a servo motor 31 is rotating, the clutch member 37 elastically deforms and the power transmission to the gear 36 and therefore to the output shaft 34 from the gear 32*j* is blocked.

Figure 7:
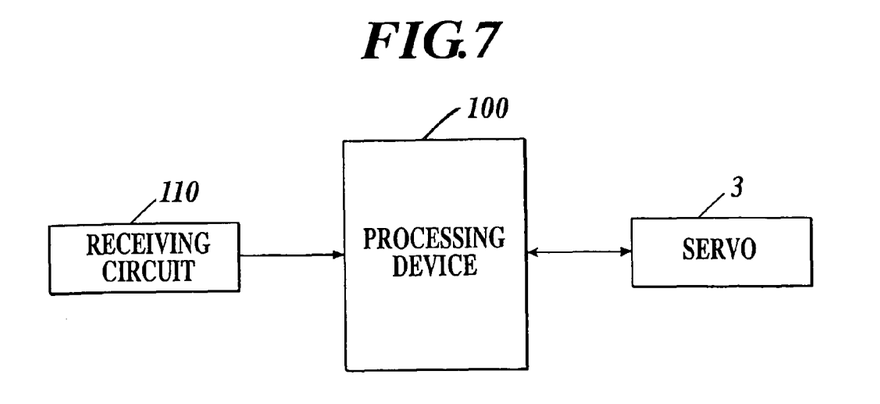
FIG. 7 is a control block diagram according to the embodiment.

Moreover, a battery (omitted from the drawing), a processing device 100, and a receiving circuit 110 are installed in the body unit of the robot toy 1 (see FIG. 7). The processing device 100 is connected to the receiving circuit 110 and the servo. In compliance with the program stored in the inner storage device, the processing device 100 processes the signals and the like from the receiving circuit 110 and the servo 3, and controls the operation of the servo motor 31. For example, when the power of the robot toy 1 is turned on, the processing device 100 applies the initial pulse to the servo motor 31 and moves the servo 3 to the center position (servo zero position).

Subsequently, an outer structure of the robot toy 1 is described. The robot toy 1 includes a body unit 10, a head unit 11, leg units 12, and hand and arm units 13. The servo 3 is installed in each joining unit of the robot toy 1.

Figure 8:
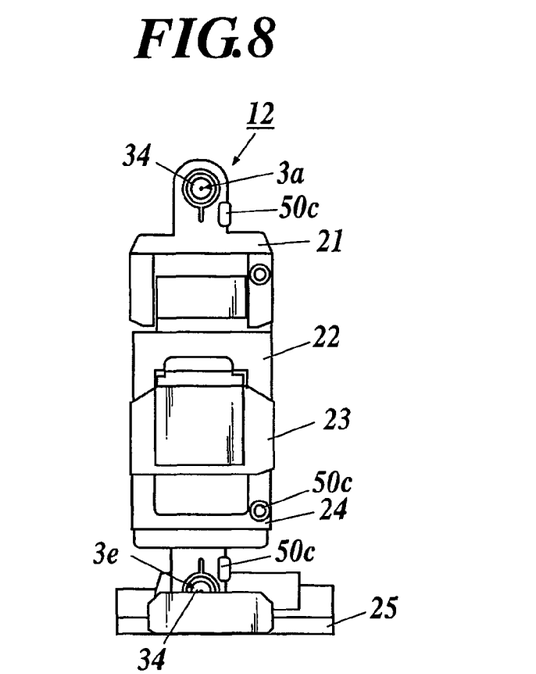
FIG. 8 is a front view of a leg unit of a robot toy according to the embodiment.

Here, the construction of the leg unit 12 is described. The leg unit 12 of the robot toy 1 includes five blocks 21, 22, 23, 24, and 25, which are roughly divided, as shown in FIG. 8 (front view) and FIG. 9 (right side view).

Figure 9:
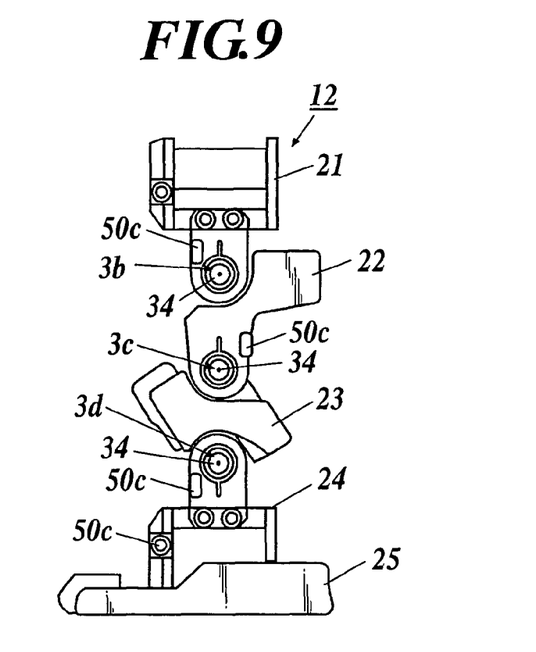
FIG. 9 is a right side view of a leg unit of a robot toy according to the embodiment.

Among these blocks, the block 21 is joined to the body unit (block) 10. That is, the servo 3*a* (a reference numeral 3*a* is used to discriminate the servo 3*a* from other servos) is installed in the body unit 10. Further, the block 21 fits to the output shaft 34 of the servo 3*a*, and thereby the block 21 is joined to the body unit 10. Therefore, when the servo motor 31 of the servo 3*a* is rotationally driven, the block 21 operates with respect to the body unit 10.

Figure 10:
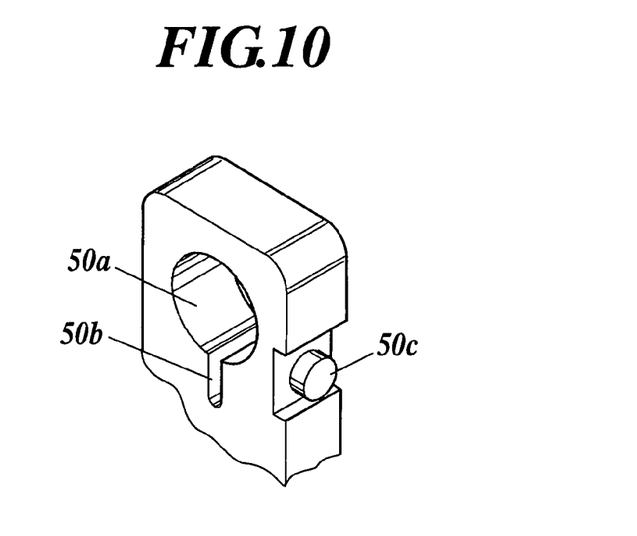
FIG. 10 is a perspective view of a joining unit of blocks of a robot toy according to the embodiment.

The joining structure of the block 21 and the body unit 10 is described in the above described case in detail. A slot (slit) 50*b* which reaches the shaft hole 50*a* is formed at the joining unit of the block 21 as shown in FIG. 10. The space of the slot 50*b* is constructed so as to be adjustable by a screw 50*c*. Further, the joining unit is constructed so that the diameter of the shaft hole 50*a* can be changed by adjusting the space of the slot 50*b* according to the fastening level of the screw 50*c*. In such case, the screw 50*c* composes a space adjustment member and therefore a shaft hole diameter adjustment member. As the shaft hole diameter adjustment member, a clamp or a clip which holds the parts facing each other across the slot 50*b* from outside can be considered other than a mere screw.

Particularly, when the screw 50*c* is loosened, the shaft hole 50*a* is in a condition where it is loosely fitted (play fit condition) to the output shaft 34. In this condition, the output shaft 34 is not integrated with the block 21, and the output shaft 34 can run idle in the shaft hole 50*a*. On the other hand, when the screw 50*c* is tightened, the shaft hole 50*a* is in a condition where it is tightly fitted (tight fit condition) to the output shaft 34. In such condition, the output shaft 34 is integrated with the block 21 and the block 21 rotates centering on the output shaft 34 when the output shaft 34 rotates.

Moreover, the block 22 is joined to the block 21. That is, the servo 3*b* (a reference numeral 3*b* is used to discriminate the servo 3*b* from other servos) is installed in the block 21. The shaft hole at the joining unit of the block 22 fits to the output shaft 34 of the servo 3*b*, and thereby the block 22 is joined to the block 21. Therefore, when the servo motor 31 of the servo 3*b* is rotationally driven, the block 22 operates with respect to the block 21.

The joining structure of the output shaft 34 and the block 22 in the above described case is the same as the joining structure of the output shaft 34 of the servo 3*b* which is installed in the body unit 10 and the block 21. That is, the slot 50*b* is formed at the joining unit of the block 22, and the space of the slot 50*b* is adjustable by a screw. The joining unit is constructed so that the diameter of the shaft hole 50*a* of the block 22 can be changed so as to be in the play fit condition or the tight fit condition with respect to the output shaft 34 of the servo 3*b* by adjusting the space of the slot 50*b*.

Further, the block 23 is joined to the block 22. That is, the servo 3*c* (a reference numeral 3*c* is used to discriminate the servo 3*c* from other servos) is installed in the block 23. The block 22 fits to the output shaft 34 of the servo 3*c*, and thereby the block 23 is joined to the block 22. Therefore, when the servo motor 31 of the servo 3*c* is rotationally driven, the block 23 operates with respect to the block 22.

The joining structure of the output shaft 34 and the block 22 in the above described case is the same as the joining structure of the output shaft 34 of the servo 3*c* which is installed in the body unit 10 and the block 21. That is, the slot 50*b* is formed at the joining unit of the block 22, and the space of the slot 50*b* is adjustable by a screw. The joining unit is constructed so that the diameter of the shaft hole 50*a* of the block 22 can be changed so as to be in the play fit condition or the tight fit condition with respect to the output shaft 34 of the servo 3*c* by adjusting the space of the slot 50*b*.

Further, the block 24 is joined to the block 23. That is, the servo 3d (a reference numeral 3d is used to discriminate the servo 3d from other servos) is installed in the block 23. The block 24 fits to the output shaft 34 of the servo 3d, and thereby the block 24 is joined to the block 23. Therefore, when the servo motor 31 of the servo 3d is rotationally driven, the block 24 operates with respect to the block 23.

The joining structure of the output shaft 34 and the block 24 in the above described case is the same as the joining structure of the output shaft 34 of the servo 3d which is installed in the body unit 10 and the block 21. That is, the slot 50b is formed at the joining unit of the block 24, and the space of the slot 50b is adjustable by a screw. The joining unit is constructed so that the diameter of the shaft hole 50a of the block 24 can be changed so as to be in the play fit condition or the tight fit condition with respect to the output shaft 34 of the servo 3d by adjusting the space of the slot 50b.

Further, the block 25 is joined to the block 24. That is, the servo 3e (a reference numeral 3e is used to discriminate the servo 3e from other servos) is installed in the block 24. The block 25 fits to the output shaft 34 of the servo 3e, and thereby the block 25 is linked to the block 24. Therefore, when the servo motor 31 of the servo 3e is rotationally driven, the block 25 operates with respect to the block 24.

The joining structure of the output shaft 34 and the block 25 in the above described case is the same as the joining structure of the output shaft 34 of the servo 3e which is installed in the body unit 10 and the block 21. That is, the slot 50b is formed at the joining unit of the block 25, and the space of the slot 50b is adjustable by a screw. The joining unit is structured so that the diameter of the shaft hole 50a of the block 25 can be changed so as to be in the play fit condition or the tight fit condition with respect to the output shaft 34 of the servo 3e by adjusting the space of the slot 50b.

Figure 11:
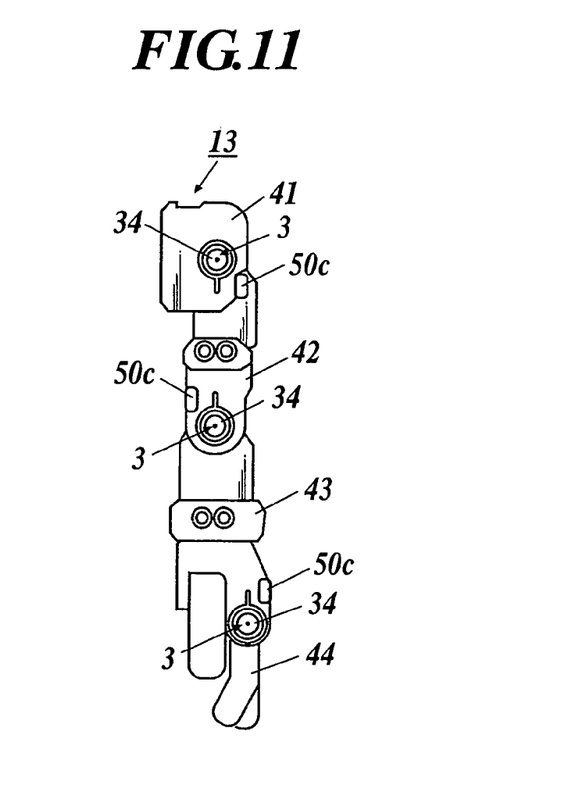
FIG. 11 is a front view of a hand and arm unit of a robot toy according to the embodiment.

Subsequently, the structure of the hand and arm unit 13 is described. The hand and arm unit 13 includes five blocks 41, 42, 43, 44, and 45, which are roughly divided, as shown in FIG. 11 (front view) and FIG. 12 (right side view). The blocks 41, 42, 43, 44, and 45 are joined in this order. The joining structure of the adjacent blocks in such case is the same as the joining structure of the adjacent blocks of the leg unit 12. Here, the joining structure of the body unit (block) 10 and the block 41 may be the same as the joining structure of the blocks of the hand and arm unit 13, or the block 41 may be fixed to the body unit 10.

Next, an assembling method of the robot toy 1 will be described with the leg unit 12 as an example.

For example, in the case where the body unit 10 and the block 21 are being joined to one another, the screw 50c is loosened and the shaft hole 50a of the block 21 is loosely fitted to the output shaft 34 of the servo 3 which is installed in the body unit 10. In such condition, the output shaft 34 is not integrated with the block 21, and the output shaft 34 can run idle in the shaft hole 50a. The angle between the body unit 10 and the block 21 is adjusted by using a position adjustment jig in the above described condition. Particularly, the angle between the body unit 10 and the block 21 is adjusted to match with the home position. While maintaining the above described condition, the servo 3 is energized and the screw 50c is tightened after the center position (servo zero position) of the servo 3 is provided. In such way, the servo zero position and the home position of the body unit 10 and the block 21 can be matched with one another.

In the same manner as described above, the adjacent blocks of the leg unit 12 are joined to one another, and the adjacent blocks of the hand and arm unit 13 are joined to one another.

The embodiment of the present invention is described above. However, the present invention is not limited to the embodiment, and can be variously modified within the gist of the invention.

For example, in the above embodiment, a description is given for the case where the blocks are joined one by one in order. However, for example, the positional relationship between the adjacent blocks of the leg unit 12 can be adjusted to match with the home position of the robot toy 1 itself by a position adjustment jig 60, and the output shaft 34 and the shaft hole 50a may be adjusted to be in the tight fit condition by the space adjustment member in a state where the servo 3 is at the center position after the power of the robot toy 1 is turned on while a the reset button in a condition where the entire construction of blocks of the leg unit 12 are loosely joined to one another (the condition where the shaft 34 of the servo 3 and the shaft hole 50a are loosely fitted to one another).

Figure 12:
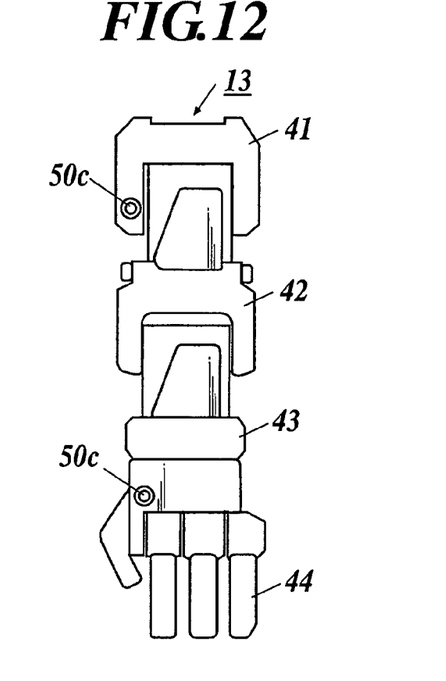
FIG. 12 is a right side view of a hand and arm unit of a robot toy according to the embodiment.
Figure 13:
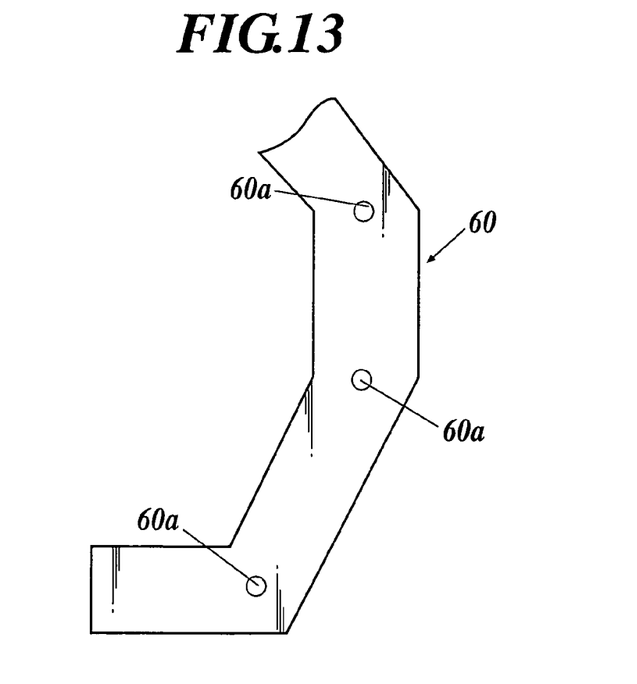
FIG. 13 is a diagram showing an example of a position adjustment jig.

An example of the position adjustment jig 60 which is used in the above described case is shown in FIG. 12. In FIG. 12, the reference numeral 60a is an indicator showing the position which corresponds to the output shaft 34 of the servo 3. When the output shaft 34 of the servo 3 is adjusted to match with the indicator 60a, the positional relationship between the blocks can be automatically adjusted to match with the home position of the robot toy 1 itself.

Here, the position adjustment jig is a fit-in type, and the positional relationship of the blocks may be automatically adjusted to match with the home position of the robot toy 1 itself when the robot toy 1 is set.

The entire disclosure of Japanese Patent Application No. 2006-352818 filed on Dec. 27, 2006 including specification, claims, drawings and abstract thereof, is incorporated herein by reference in its entirety.

What is claimed is:

1. A robot toy, comprising:
   a servo including
      a servo motor,
      a decelerating gear mechanism, and
      a rotary encoder,
   wherein the servo motor, the decelerating gear mechanism and the rotary encoder are housed in a case,
   the servo motor being installed at least one joint of the robot toy, and a shaft of a last gear of the decelerating gear mechanism and an output shaft of the servo being co-axial but rotating independently; and
   a clutch mechanism positioned between the last gear and the output shaft of the servo, the clutch mechanism including
      two protrusions, each protruding from a same end face of the last gear, each extending toward the output shaft of the servo, and being spaced from the shaft of the last gear, and
      a ring-shaped clutch member which is elastically deformable and has, at an inner periphery thereof,
         two concaved portions engaging the two protrusions, respectively, and
         two convexed portions facing each other in a direction perpendicular to a line connecting the two concaved portions, each of the two concaved portions engaging teeth of a gear provided at the output shaft of the servo.

2. The robot toy as claimed in claim 1,
wherein each of the two protrusions is formed in a shape of a half-column with a curved surface facing outwardly in a radial direction of the last gear, and
wherein the clutch member is elastically deformable in a radial direction of the last gear.

3. A robot toy, comprising:
a first block;
a second block;
a servo installed at a joint portion of the first block and second block, the servo including a servo motor, a decelerating gear mechanism, a rotary encoder and a clutch mechanism which are housed in a case, wherein
a center of an output shaft of the servo matches a center of a shaft of a last gear of the decelerating gear mechanism, but the respective shafts rotate independently, and
the clutch mechanism is installed between the last gear and the output shaft, the clutch mechanism including:
a gear provided on the output shaft of the servo;
two protrusions, each being spaced from the shaft of the last gear, protruding from the end face of the last gear toward the output shaft of the servo, having a half-column shape with an outside surface thereof that is curved, and facing each other across the shaft of the last gear; and
a ring-shaped clutch member which is elastically deformable and which has, at an inner periphery thereof, two concaved portions engaging the two half-column shaped protrusions, respectively, and two convexed portions facing each other in a direction perpendicular to a line connecting the two concaved portions, each of the two convexed portions engaging teeth of the gear provided at the output shaft of the servo.

* * * * *

UNITED STATES PATENT AND TRADEMARK OFFICE
CERTIFICATE OF CORRECTION

| | | |
|---|---|---|
| PATENT NO. | : 7,862,398 B2 | Page 1 of 1 |
| APPLICATION NO. | : 11/822300 | |
| DATED | : January 4, 2011 | |
| INVENTOR(S) | : Yosuke Yoneda et al. | |

It is certified that error appears in the above-identified patent and that said Letters Patent is hereby corrected as shown below:

Column 6, Line 47 in Claim 1, delete "at least" and insert -- at at least --, therefor.

Signed and Sealed this
Twenty-sixth Day of April, 2011

David J. Kappos
*Director of the United States Patent and Trademark Office*